United States Patent
Susca et al.

(10) Patent No.: US 12,025,084 B1
(45) Date of Patent: Jul. 2, 2024

(54) IN-TANK EJECTOR PUMP

(71) Applicant: Hamilton Sundstrand Corporation, Charlotte, NC (US)

(72) Inventors: Ryan Prescott Susca, Windsor, CT (US); Ryan Shook, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/208,693

(22) Filed: Jun. 12, 2023

(51) Int. Cl.
  *F02M 37/18* (2006.01)
  *F02M 37/00* (2006.01)
  *F02M 37/32* (2019.01)

(52) U.S. Cl.
  CPC ........ *F02M 37/18* (2013.01); *F02M 37/0047* (2013.01); *F02M 37/32* (2019.01)

(58) Field of Classification Search
  CPC ..... F02M 37/18; F02M 37/32; F02M 37/0047
  See application file for complete search history.

(56) References Cited

U.S. PATENT DOCUMENTS

| | | | |
|---|---|---|---|
| 4,332,527 A | 6/1982 | Moldovan et al. | |
| 4,339,917 A | 7/1982 | LaGrone | |
| 4,704,070 A | 11/1987 | Iseman | |
| 5,647,328 A * | 7/1997 | Fournier | F02M 37/106 137/574 |
| 8,562,303 B2 * | 10/2013 | Mori | F04B 49/06 417/42 |
| 10,358,980 B2 | 7/2019 | Morioka et al. | |
| 2006/0112937 A1* | 6/2006 | Tittmann | F02M 37/106 123/510 |
| 2007/0283935 A1* | 12/2007 | Yuda | F02M 63/027 123/446 |
| 2013/0036738 A1 | 2/2013 | Pora | |
| 2014/0219826 A1 | 8/2014 | Clements | |
| 2015/0219037 A1* | 8/2015 | Ramamurthy | F02D 41/062 137/565.11 |
| 2018/0050812 A1* | 2/2018 | Ribarov | F02C 7/236 |
| 2022/0074377 A1* | 3/2022 | Talaski | F02M 37/10 |

FOREIGN PATENT DOCUMENTS

DE  112014001098 B4 *  8/2017  ......... F02M 37/0023

* cited by examiner

*Primary Examiner* — Grant Moubry
(74) *Attorney, Agent, or Firm* — Kinney & Lange, P. A.

(57) ABSTRACT

In accordance with at least one aspect of this disclosure, a system includes an in-tank fuel pump configured to be disposed in a fuel tank to supply fuel from the fuel tank to a fuel line at a first pressure. A boost pump is configured to be disposed in the fuel line to receive fuel from the in-tank fuel pump and supply the fuel to one or more downstream components at a boost pressure. An augmentation pump system is configured to be disposed in the fuel line to receive fuel from the boost pump and to supply fuel at a second pressure to one of, at least one fuel consuming component downstream of the augmentation pump system, or an in-tank ejector pump, based on an operational state of the in-tank fuel pump.

20 Claims, 2 Drawing Sheets

IN-TANK EJECTOR PUMP

TECHNICAL FIELD

The present disclosure relates to fuel systems and more particularly to fuel systems having ejector pumps.

BACKGROUND

Certain conventional fuel systems include an inducer pump in the fuel tank for supplying fuel to the fuel consuming components of a system in the event of a failure of a main fuel tank fuel pump. However, inducer pumps can continuously run during operation of the fuel system, even if the in-tank fuel pump is operational, which can reduce the overall efficiency of the system. Moreover, certain inducers can dictate the speed range and size of the boost pump, because the boost pump can only operate as fast as the inducer.

The conventional techniques have been considered satisfactory for their intended purpose. However, there is an ever present need for improved systems and methods which are lighter and more efficient. This disclosure provides a solution for this need.

SUMMARY

In accordance with at least one aspect of this disclosure, a system includes an in-tank fuel pump configured to be disposed in a fuel tank to supply fuel from the fuel tank to a fuel line at a first pressure. A boost pump is configured to be disposed in the fuel line to receive fuel from the in-tank fuel pump and supply the fuel to one or more downstream components at a boost pressure. An augmentation pump system is configured to be disposed in the fuel line to receive fuel from the boost pump and to supply fuel at a second pressure to one of, at least one fuel consuming component downstream of the augmentation pump system, or an in-tank ejector pump, based on an operational state of the in-tank fuel pump.

The system includes the in-tank ejector pump configured to be disposed in the fuel tank to supply fuel from the fuel tank to the boost pump based on an operational state of the in-tank fuel pump (e.g., when the in-tank fuel pump has failed). In embodiments, the in-tank ejector pump can include a receiver configured to receive fuel from the augmentation pump system and a venturi section fluidly connected to the receiver configured to draw fuel from the fuel tank through the venturi section and supply fuel to the boost pump.

In embodiments, the augmentation pump system can include a centrifugal pump (e.g., a high speed centrifugal pump) configured to be disposed in the fuel line downstream of the boost pump, and a selector valve configured to be disposed in the fuel line downstream of the centrifugal pump. The selector valve can be configured to selectively communicate the centrifugal pump to the at least one fuel consuming component downstream of the augmentation pump system or to the in-tank ejector pump based on a state of the selector valve. In certain embodiments, the state of the selector valve can be actively controlled, e.g., via a controller.

The controller can be operatively connected to the selector valve and the controller can be configured to monitor the operational state of the in-tank fuel pump. In an operational state of the in-tank fuel pump, the controller can be configured to toggle the selector valve to a first state to communicate the centrifugal pump to the at least one fuel consuming component downstream of the augmentation pump system. In a failed state of the in-tank fuel pump, the controller can be configured to toggle the selector valve to a second state to communicate the centrifugal pump to the in-tank ejector pump.

In embodiments, the augmentation pump system can include an inlet shut off valve operatively connected to the controller and configured to be disposed in the fuel line upstream of the centrifugal pump. In the operational state of the in-tank fuel pump, the controller can be configured to control the inlet shut off valve to selectively allow or block flow to the centrifugal pump based on a fuel demand fuel consuming component downstream of the centrifugal pump or the operational state of the in-tank fuel pump. In embodiments, the at least one fuel consuming component downstream of the augmentation pump system can be or include an augmenter (e.g., spray bars of an afterburner system).

In embodiments, the augmentation pump system can include a check valve configured to be disposed in the fuel line between the centrifugal pump and the selector valve. The check valve can be configured to allow communication of the centrifugal pump with the selector valve based on a pressure in the fuel line at the outlet of the centrifugal pump. In certain embodiments, the augmentation pump system can include a sensor (e.g., a pressure sensor) configured to be disposed in the fuel line. The sensor can be configured to sense the pressure in the fuel line downstream of the centrifugal pump and output a signal indicative of a state of the centrifugal pump based on the pressure in the fuel line. In certain embodiments, the sensor can be configured to be disposed in the fuel line between the check valve and the selector valve In embodiments, the system can include a main fuel pump (and fuel control therein) configured to be disposed in a first fuel branch of the fuel line, downstream of the boost pump. The main fuel pump can be configured to supply fuel at a third pressure from the boost pump to at least one at least one fuel consuming component downstream of the main pump. In certain embodiments, the at least one fuel consuming component downstream of the main pump can be or include a fuel consuming engine, including one or more fuel nozzles of the engine.

In embodiments, the system can include an actuation pump configured to be disposed in a second fuel line branch of the fuel line, downstream of the boost pump. The actuation pump can be configured to supply fuel at a fourth pressure from the boost pump to at least one fuel consuming component downstream of the actuation pump. In certain embodiments, the at least one fuel consuming component downstream of the actuation pump can be or include an actuation system. A fuel filter can be configured to be disposed in the fuel line downstream of the boost pump and upstream of the first fuel line branch and the second fuel line branch. In certain embodiments, the fuel filter can be the branch point of the first and second fuel line branches from the fuel line.

In accordance with at least one aspect of this disclosure, a fuel system can include, a fuel tank, a first fuel line, and an in-tank fuel pump disposed in the fuel tank configured to supply fuel from the fuel tank to the first fuel line at a first pressure in an operational state of the in-tank fuel pump. An in-tank ejector pump can be disposed in the fuel tank configured to supply fuel from the fuel tank to the first fuel line at a first pressure in a failed state of the in-tank fuel pump. A boost pump can be disposed in the first fuel line configured to receive fuel from the in-tank fuel pump or the in-tank ejector pump and supply the fuel to one or more downstream components at a boost pressure. An augmentation pump system can be disposed in the fuel line downstream of the boost pump configured to receive fuel from the boost pump. The augmentation pump system can be configured to supply fuel at a second pressure to one of: at least one fuel consuming component downstream of the augmentation pump system, or, the in-tank ejector pump, based on a state of the in-tank fuel pump (e.g., operational or failed).

In embodiments the augmentation pump system can include a centrifugal pump disposed in the first fuel line and a selector valve disposed in the first fuel line downstream of the centrifugal pump. The selector valve can be configured to selectively communicate the centrifugal pump to the fuel consuming component downstream of the centrifugal pump or the in-tank ejector pump based on a state of the selector valve. The augmentation pump system can also include an inlet shut off valve disposed in the first fuel line upstream of the centrifugal pump. The inlet shut off valve can be configured to selectively allow or block flow to the centrifugal pump based on a fuel demand at the fuel consuming component downstream of the centrifugal pump or the operational state of the in-tank fuel pump.

In embodiments the fuel system can include a second fuel line branching from the first fuel line downstream of the boost pump and a main pump disposed in a first branch of the second fuel line configured to supply flow from the boost pump to at least one fuel consuming component downstream of the main pump at a third pressure, where the fuel consuming component can be or include a fuel consuming engine. An actuation pump can be disposed in a second branch of the second fuel line configured to supply flow from the boost pump to at least one fuel consuming component downstream of the actuation pump at a fourth pressure, where the fuel consuming component can be or include an actuation system.

A filter can be disposed in the first fuel line at a branch point of the second fuel line from the first fuel line. The fuel system can include a return fuel line configured to supply excess fuel from the main fuel pump back to the first fuel line downstream of the boost pump and upstream of the filter.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein.

DETAILED DESCRIPTION

Figure 1:
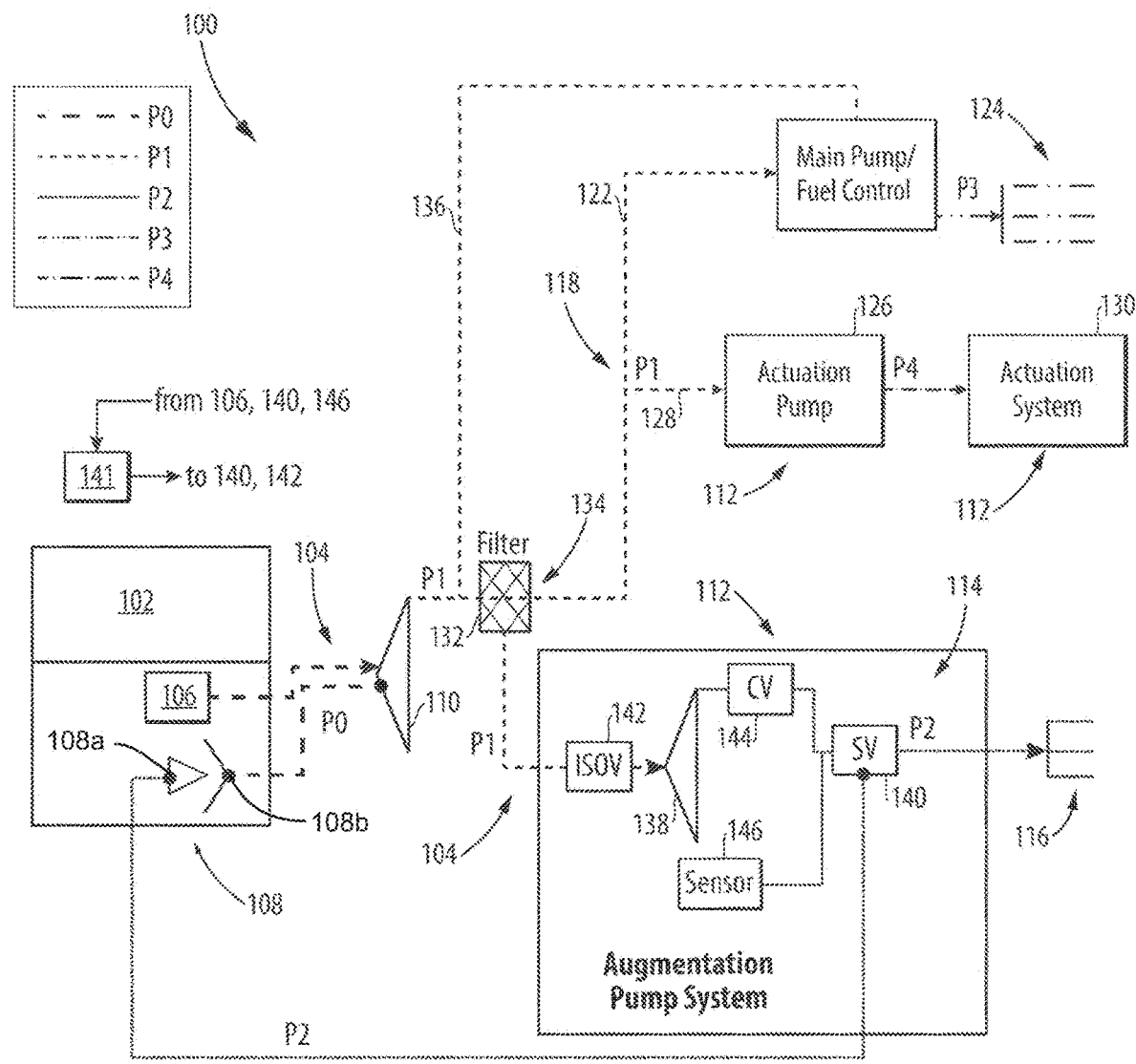
FIG. 1 is a schematic diagram of an embodiment of a system in accordance with this disclosure, showing the system in a first state.
Figure 2:
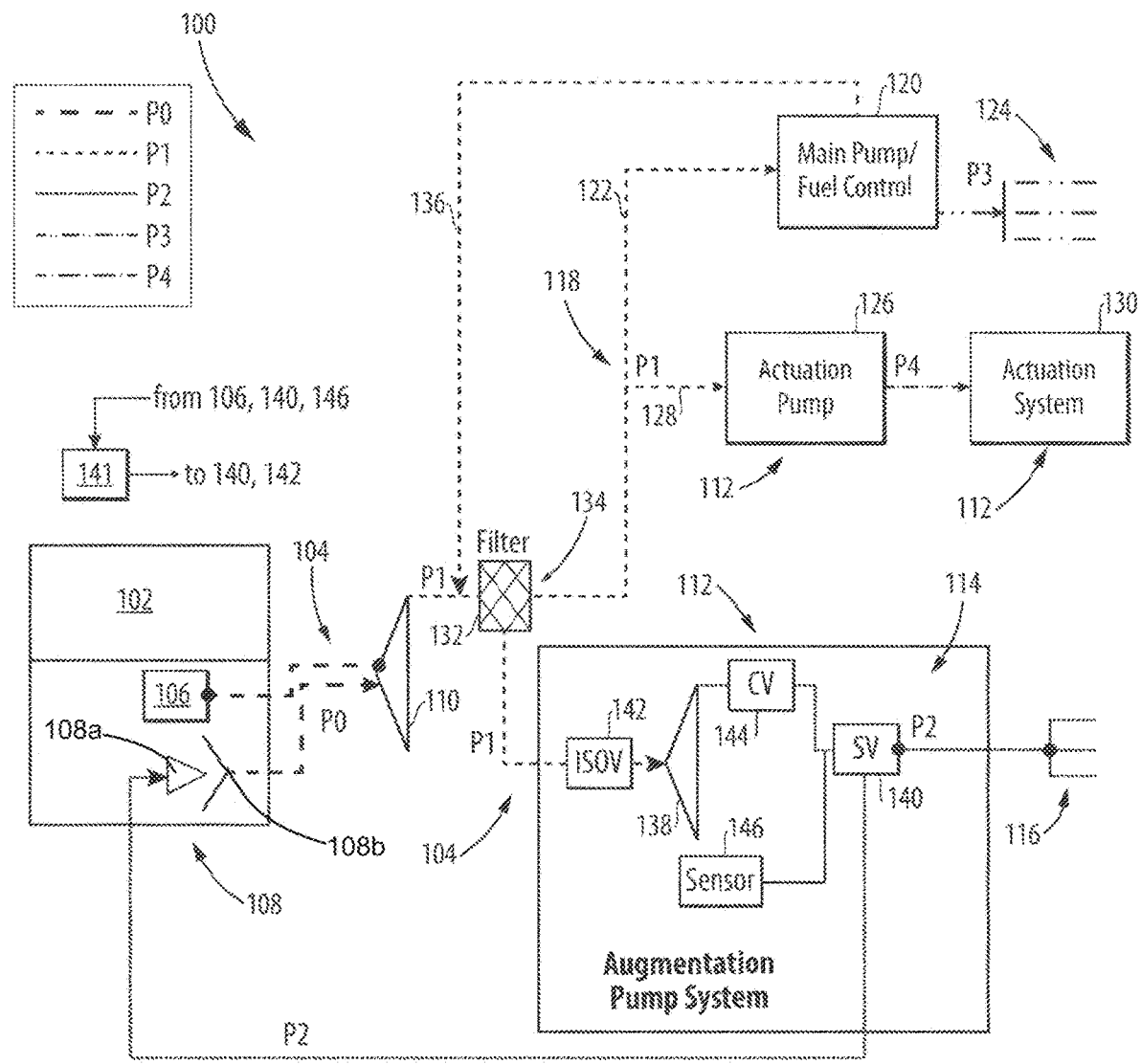
FIG. 2 is a schematic diagram of the system of FIG. 1, showing the system in a second state.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2.

In accordance with at least one aspect of this disclosure, a fuel system 100 can include a fuel tank 102, a first fuel line 104, and an in-tank fuel pump 106 disposed in the fuel tank 102 configured to supply fuel from the fuel tank 102 to the first fuel line 104 at a first pressure P0 in an operational state of the in-tank fuel pump 106 (e.g., as shown in FIG. 1). An in-tank ejector pump 108 can be disposed in the fuel tank 102 configured to supply fuel from the fuel tank 102 to the first fuel line 104 at the first pressure P0 in a failed state of the in-tank fuel pump 106 (e.g., as shown in FIG. 2). A boost pump 110 can be disposed in the first fuel line 104 configured to receive fuel from the in-tank fuel pump 106 or the in-tank ejector pump 108 and supply the fuel to one or more downstream components 112 at a boost pressure P1. The boost pressure P1 can be greater than the first pressure P0. The one or more downstream components 112 can be or include any one of, pumps, valves, or fuel consuming components, e.g., as described herein and appreciated by one having ordinary skill in the art in view of this disclosure.

An augmentation pump system 114 can be disposed in the first fuel line 104 downstream of the boost pump 110 configured to receive fuel from the boost pump 110 and to supply fuel at a second pressure P2 to a fuel consuming component 116 downstream of the augmentation pump system 114 in an operational state of the in-tank fuel pump 106. Or, in the failed state of the in-tank fuel pump 106, the augmentation pump system 114 can be configured to supply fuel at the second pressure P2 to the in-tank ejector pump 108. In embodiments, the in-tank ejector pump 108 can include a receiver 108a configured to receive fuel from the augmentation pump system 114 and a venturi section 108b fluidly connected to the receiver 108a configured to draw fuel from the fuel tank 102 through the venturi section 108b (e.g., entrained with the fuel supplied by the augmentation pump system 114 at the receiver 108a) and supply the fuel to the boost pump 110.

In embodiments the fuel system 100 can include a second fuel line 118 branching from the first fuel line 104 downstream of the boost pump 110. A main pump 120 (e.g., an airframe pump) can be disposed in a first branch 122 of the second fuel line 118 configured to supply flow from the boost pump 110 to a fuel consuming component 124 downstream of the main pump 120 at a third pressure P3. In embodiments, the fuel consuming component 124 downstream of the main pump 120 can be or include a fuel consuming engine 124 (e.g., including one or more fuel nozzles of the engine). In embodiments, e.g., as shown, an actuation pump 126 can be disposed in a second branch 128 of the second fuel line 118 configured to supply flow from the boost pump 110 to a component 130 downstream of the actuation pump 128 at a fourth pressure P4. In embodiments, the downstream component 130 can be or include an actuation system 130.

A filter 132 can be disposed in the first fuel line 104 at a branch point 134 of the second fuel line 114 from the first fuel line 104. A return fuel line 136 can supply excess fuel from the main fuel pump/fuel control system 120 back to the first fuel line 104 downstream of the boost pump 110 and upstream of the filter 132.

Still with reference to FIGS. 1 and 2, in embodiments the augmentation pump system 114 can include a centrifugal pump 138 (e.g., a high speed centrifugal pump) disposed in the first fuel line 104 and a selector valve 140 disposed in the first fuel line 104 downstream of the centrifugal pump 138. The selector valve 140 can be configured to selectively communicate the centrifugal pump 138 to the component 116 downstream of the augmentation pump system 114 (e.g., as shown in FIG. 1) or the in-tank ejector pump 108 (e.g., as shown in FIG. 2) based on a state of the selector valve 140. In certain embodiments, the state of the selector valve can be actively controlled, e.g., via a controller 141.

The controller 141 can be operatively connected to the selector valve 140 and the controller 141 can be configured to monitor the operational state of the in-tank fuel pump 106 to control the selector valve 140 based on the state of the pump 106. In certain embodiments, the controller 141 can receive an external signal indicative of the state of the in-tank fuel pump 106 (e.g., from another controller) In the operational state of the in-tank fuel pump (FIG. 1), the controller 141 can be configured to toggle the selector valve 140 to a first state to communicate the centrifugal pump 138 to the component 116 downstream of the augmentation pump system 114, if the component 116 is needed (e.g., as discussed below). In the failed state of the in-tank fuel pump 106 (FIG. 2), the controller 141 can be configured to toggle the selector valve 140 to a second state to communicate the centrifugal pump 138 to the in-tank ejector pump to supply fuel to the boost pump 110 and the rest of the downstream components 112.

The augmentation pump system 114 can also include an inlet shut off valve 142 disposed in the first fuel line 104 upstream of the centrifugal pump 138. The inlet shut off valve 142 can be configured to selectively allow or block flow to the centrifugal pump 138 based on a fuel demand at the fuel consuming component 116 downstream of the augmentation pump system 114 or the status of the in-tank pump 106. In embodiments, the component 116 can be an augmenter (e.g., including spray bars of an afterburner system) which may only be needed for a short time during a mission. Thus, if the augmenter 116 is not needed, flow to the centrifugal pump 138 can be blocked by the inlet shut off valve 142, leaving the centrifugal pump 138 running, but running dry.

In embodiments, the augmentation pump system 114 can include a check valve 144 disposed in the first fuel line 104 between the centrifugal pump 138 and the selector valve 140. The check valve 144 can be configured to allow communication of the centrifugal pump 138 with the selector valve 140 based on a pressure in the first fuel line 104 at the outlet of the centrifugal pump 138. In certain embodiments, the augmentation pump system 114 can include a sensor 146 (e.g., a pressure sensor) configured to sense the pressure P2 in the fuel line 104 downstream of the centrifugal pump 138 and output a signal indicative of a state of the centrifugal pump 138 based on the pressure in the fuel line 104. The sensor 146 can output a signal indicative of the centrifugal pump 138 actively pumping, or running dry, or in an off state, for example. In certain embodiments, the sensor 146 can be disposed in the fuel line 104 between the check valve 144 and the selector valve 140.

Conventional fuel systems can include an inducer (e.g., a vacuum pump) in the fuel tank configured to supply fuel to the boost pump in the event of a failed in-tank pump. However, in order to be ready to supply fuel in the event of a failure, the inducer is typically constantly running to pull fuel to the boost pump, which can the overall system less efficient. This can be detrimental to the system when the inducer is only needed for the rare occurrence of an in-tank pump failure. Embodiments all for removal of the inducer and replacement with a passive ejector pump, which operates only when needed. The ejector pump can be connected to an augmenter pump system, to selective supply flow to the ejector pump only in emergency scenarios, e.g., an in-tank pump failure. The augmenter pump system can include a high speed centrifugal pump with dry out functionality, which can operate to supply fuel to an augmenter if needed, or the pump can run idle (e.g., only against the bearings) until it is needed for supplying fuel to the augmenter or the ejector pump based on, the state of the in-tank fuel pump and/or the demand for fuel at the augmenter.

Removing the inducer and replacing it with an ejector pump, as described herein, can reduce the fuel system weight, parasitic horsepower draws, and pump system heat rejection into the fuel, thus allowing aircraft to carry more fuel and increase aircraft heat rejection into the fuel (from other sources). Further, inducers can limit the size and speed of the boost pump, as the boost pump can only run as fast as the inducer. Replacing the inducer with embodiments of the ejector described herein allows for a much faster and smaller boost pump to be utilized, allowing the boost stage to be the high speed element, further improving weight savings and efficiency of the system.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising:
   an in-tank fuel pump configured to be disposed in a fuel tank to supply fuel from the fuel tank to a fuel line at a first pressure;
   a boost pump configured to be disposed in the fuel line to receive fuel from the in-tank fuel pump and supply the fuel to one or more downstream components at a boost pressure;
   an augmentation pump system configured to be disposed in the fuel line to receive fuel from the boost pump and to supply fuel at a second pressure to one of: a fuel consuming component downstream of the augmentation pump system, or an in-tank ejector pump, based on an operational state of the in-tank fuel pump.

2. The system of claim 1, further comprising the in-tank ejector pump, wherein the in-tank ejector pump is configured to be disposed in the fuel tank to supply fuel from the fuel tank to the boost pump based on an operational state of the in-tank fuel pump.

3. The system of claim 2, wherein the in-tank ejector pump includes a receiver configured to receive fuel from the augmentation pump system and a venturi section fluidly connected to the receiver configured to draw fuel from the fuel tank through the venturi section and supply fuel to the boost pump.

4. The system of claim 2, wherein the augmentation pump system comprises a centrifugal pump configured to be disposed in the fuel line downstream of the boost pump, and a selector valve configured to be disposed in the fuel line downstream of the centrifugal pump, wherein the selector valve is configured to selectively communicate the centrifugal pump to the at least one downstream fuel consuming component or to the in-tank ejector pump based on a state of the selector valve.

5. The system of claim 4, further comprising a controller operatively connected to the selector valve, wherein the controller is configured to monitor the operational state of the in-tank fuel pump,
   wherein in an operational state of the in-tank fuel pump, the controller is configured to toggle the selector valve to a first state to communicate the centrifugal pump to the fuel consuming component downstream of the augmentation pump system, and
   wherein in a failed state of the in-tank fuel pump, the controller is configured to toggle the selector valve to a second state to communicate the centrifugal pump to the in-tank ejector pump.

6. The system of claim 5, wherein the augmentation pump system further comprises an inlet shut off valve operatively connected to the controller and configured to be disposed in the fuel line upstream of the centrifugal pump, wherein in the operational state of the in-tank fuel pump, the controller is configured to control the inlet shut off valve to selectively allow or block flow to the centrifugal pump based on a fuel demand of the fuel consuming component downstream of the augmentation pump system or the operational state of the in-tank fuel pump.

7. The system of claim 6, wherein the fuel consuming component downstream of the augmentation pump system includes an augmenter.

8. The system of claim 6, wherein the augmentation pump system further comprises a check valve configured to be disposed in the fuel line between the centrifugal pump and the selector valve configured to allow communication of the centrifugal pump with the selector valve based on a pressure in the fuel line at the outlet of the centrifugal pump.

9. The system of claim 1, further comprising, a main fuel pump configured to be disposed in a first fuel branch, downstream of the boost pump, wherein the main fuel pump is configured to supply fuel at a third pressure from the boost pump to a fuel consuming component downstream of the main pump.

10. The system of claim 9, wherein the fuel consuming component downstream of the main pump includes a fuel consuming engine.

11. The system of claim 9, further comprising, an actuation pump configured to be disposed in a second fuel line branch, downstream of the boost pump, wherein the actuation pump is configured to supply fuel at a fourth pressure from the boost pump to a fuel consuming component downstream of the actuation pump.

12. The system of claim 11, wherein the fuel consuming component downstream of the actuation pump includes an actuation system.

13. The system of claim 12, further comprising a filter configured to be disposed in the fuel line downstream of the boost pump and upstream of the first fuel line branch and the second fuel line branch.

14. A fuel system, comprising:
    a fuel tank;
    a first fuel line;
    an in-tank fuel pump disposed in the fuel tank configured to supply fuel from the fuel tank to the first fuel line at a first pressure in an operational state of the in-tank fuel pump;
    an in-tank ejector pump disposed in the fuel tank configured to supply fuel from the fuel tank to the first fuel line at a first pressure in a failed state of the in-tank fuel pump;
    a boost pump disposed in the first fuel line configured to receive fuel from the in-tank fuel pump or the in-tank ejector pump and supply the fuel to one or more downstream components at a boost pressure;
    an augmentation pump system disposed in the fuel line downstream of the boost pump configured to receive fuel from the boost pump and to supply fuel at a second pressure to one of: at least one component downstream of the augmentation pump system, or, the in-tank ejector pump, based on a state of the in-tank fuel pump.

15. The fuel system of claim 14, wherein the augmentation pump system further comprises a centrifugal pump disposed in the first fuel line and a selector valve disposed in the first fuel line downstream of the centrifugal pump, wherein the selector valve is configured to selectively communicate the centrifugal pump to the fuel consuming component downstream of the centrifugal pump or the in-tank ejector pump based on a state of the selector valve.

16. The fuel system of claim 15, wherein the augmentation pump system further includes an inlet shut off valve disposed in the first fuel line upstream of the centrifugal pump, wherein the inlet shut off valve is configured to selectively allow or block flow to the centrifugal pump based on a fuel demand at the fuel consuming component downstream of the centrifugal pump or the operational state of the in-tank fuel pump.

17. The fuel system of claim 14, further comprising;
a second fuel line branching from the first fuel line downstream of the boost pump; and
a main pump disposed in a first branch of the second fuel line configured to supply flow from the boost pump to fuel consuming component downstream of the main pump at a third pressure, wherein the fuel consuming component downstream of the main pump includes a fuel consuming engine.

18. The fuel system of claim 17, further comprising;
an actuation pump disposed in a second branch of the second fuel line configured to supply flow from the boost pump to a fuel consuming component downstream of the actuation pump at a fourth pressure, wherein the fuel consuming component downstream of the actuation pump includes an actuation system.

19. The fuel system of claim 18, further comprising a filter disposed in the first fuel line at a branch point of the second fuel line from the first fuel line.

20. The fuel system of claim 1, further comprising a return fuel line configured to supply excess fuel from the main fuel pump back to the first fuel line downstream of the boost pump and upstream of the filter.

\* \* \* \* \*